July 5, 1932.  H. C. PENNINGTON  1,866,221
ELECTRIC STEAM RADIATOR
Filed Sept. 22, 1931   2 Sheets-Sheet 1

INVENTOR
Harold C. Pennington
BY
James Cottrell
ATTORNEY

July 5, 1932.  H. C. PENNINGTON  1,866,221
ELECTRIC STEAM RADIATOR
Filed Sept. 22, 1931   2 Sheets-Sheet 2
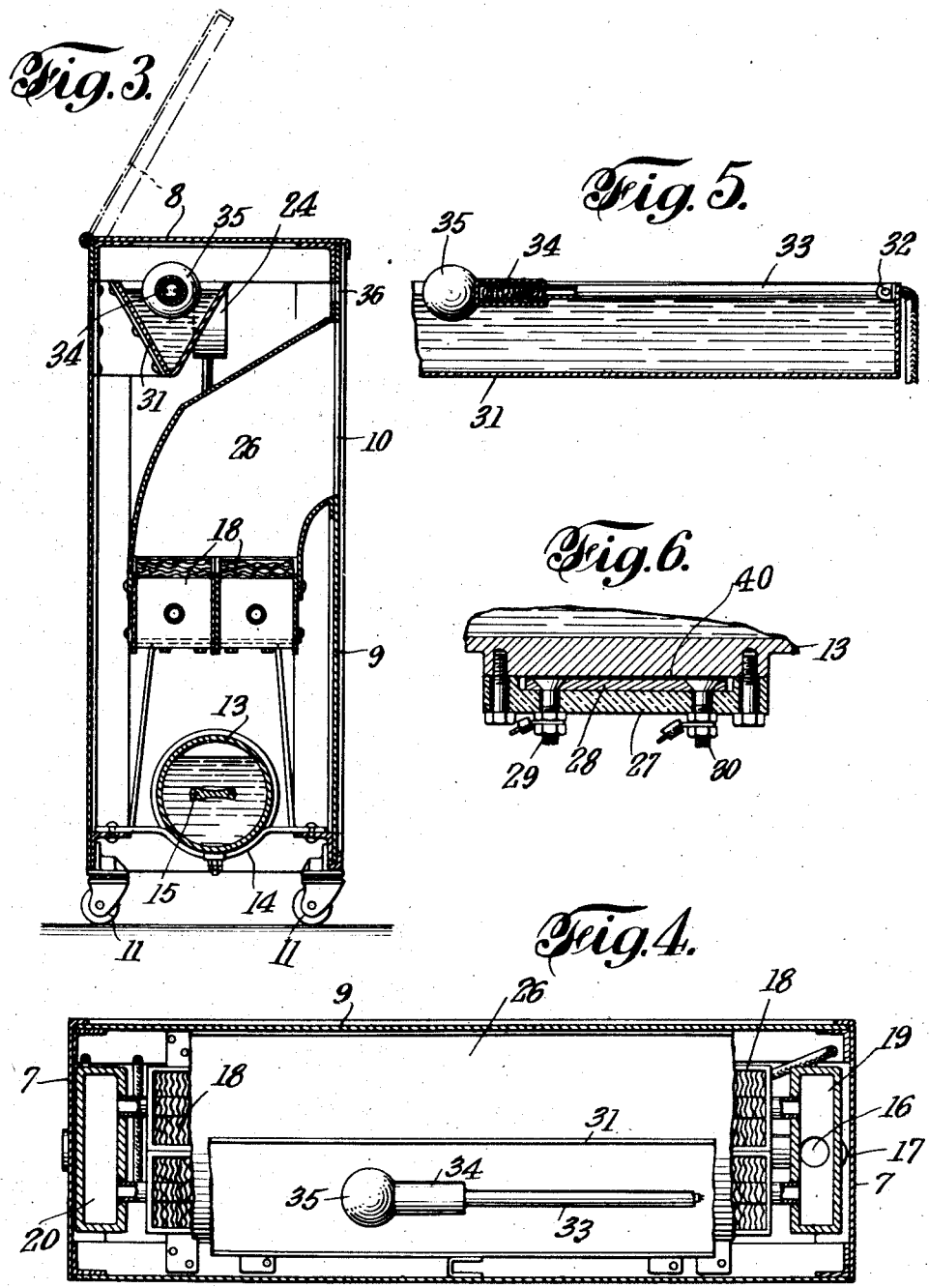

Patented July 5, 1932

1,866,221

UNITED STATES PATENT OFFICE

HAROLD C. PENNINGTON, OF EAST ORANGE, NEW JERSEY, ASSIGNOR TO JOSEPH B. GRISON, OF NEW YORK, N. Y., AND CHARLES R. MORTON, OF SUMMIT, NEW JERSEY

ELECTRIC STEAM RADIATOR

Application filed September 22, 1931. Serial No. 564,323.

This invention relates to heating devices for dwellings, and more particularly to a portable device in which the heat transmitting medium is steam and the source of heat is electrical current.

Heretofore, portable heating devices have relied upon gas as a source of heat, or upon the heat produced by electricity and transmitted by radiation. The gas heater is objectionable in that it burns up the oxygen in the air and it is necessary to provide vents to the exterior of the room to discharge the products of combustion. Also, the gas heater is inefficient and uneconomical, the efficiency of the gas heater seldom exceeding 35%. The portable electric radiant heater, as is well known, does not heat the atmosphere, but heats only objects directly in the path of the heat waves emanating from the source of heat. The radiant electric heater is usually provided with a parabolic reflecting surface which throws the heat waves in a straight path directly to the front of the heater. The effect is an intense heat immediately in front of the heater while the surrounding objects are cold. The objections to this type of heater are obvious. Furthermore, such heaters are not safe in that the heating element is exposed and may be touched by children, or pieces of paper or fabric may contact therewith and become ignited and probably cause a serious fire.

It is an object of this invention to provide a steam heating apparatus in which the source of heat is an electric current.

A further object is the provision of a household heating device having a self-contained power plant in the nature of a boiler for creating steam and an electrical heating unit for heating the water in the boiler.

A further object is the provision of an electric-steam portable house-hold heating device having means by which the electrical source of heat is discontinued when the pressure of the steam rises to a predetermined amount, and in which the electrical heating element again becomes operative when the pressure of the steam drops to a predetermined amount.

A further object is the provision of a portable electric steam heating device having means for enabling the escape of steam when the pressure of the latter exceeds a predetermined amount.

A further object is the provision in an electric steam heating device having a boiler with an electric heating unit therein of means for breaking the electric current circuit to the heating unit when the temperature of the boiler exceeds a predetermined amount.

A further object is the provision of a novel device for creating water vapor for the purpose of humidifying the atmosphere.

A further object is the provision of a portable electric steam heating device having a drying rack attached to the ends and top thereof for quickly and cleanly drying hosiery, lingerie, etc.

These and other objects are attained by the novel construction, combination and arrangement of parts hereinafter described and shown in the accompanying drawings, constituting a material part of this disclosure, and in which:

Fig. 3 is a sectional view taken on line 3—3 of Fig. 2.

Fig. 4 is a sectional view taken on line 4—4 of Fig. 2.

Fig. 5 is a view, partially in section, showing details of the humidifying apparatus used in the device.

Fig. 6 is a sectional view of a safety device in the nature of a fusible electrical connection attached to the boiler of the steam heating device.

Figure 1:
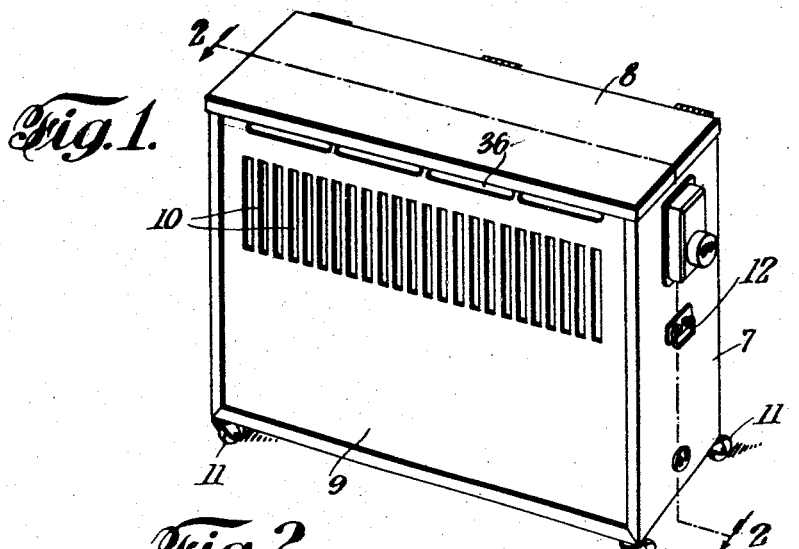
Fig. 1 is a perspective view of the heating device.
Figure 2:
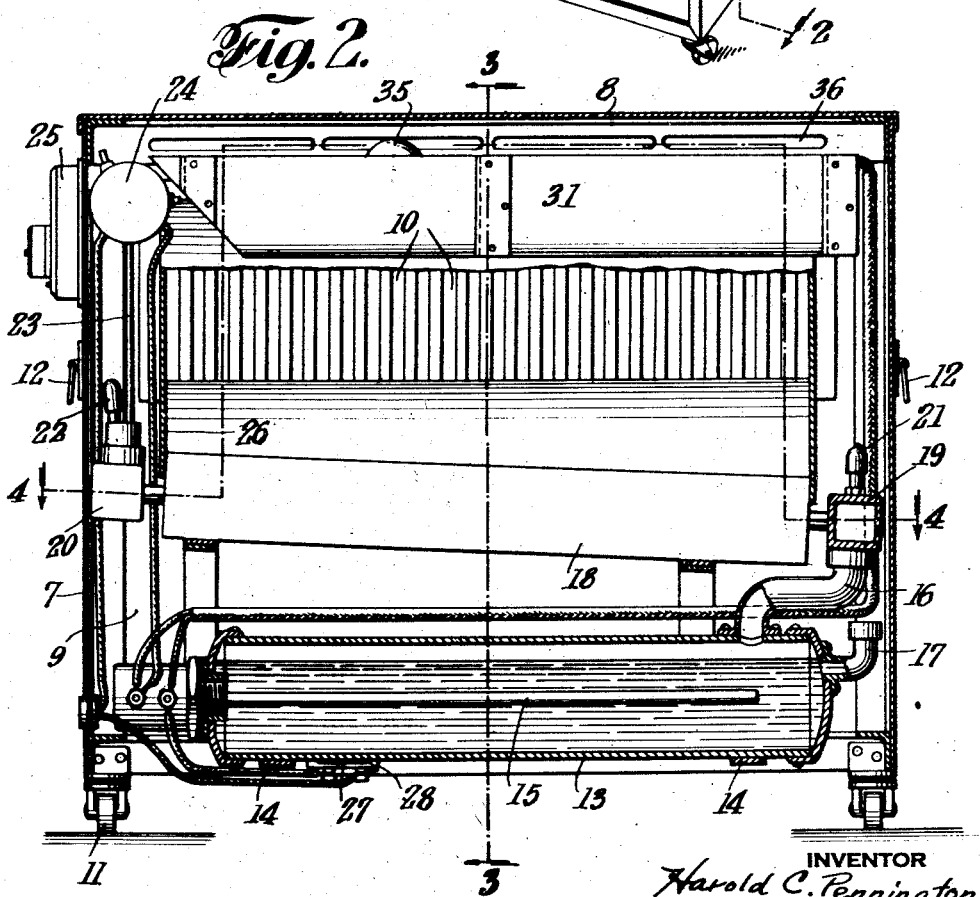
Fig. 2 is a sectional view taken on line 2—2 of Fig. 1.

Referring to the drawings, the heating device is shown to include a casing 7 having hinged to the rear wall thereof a top 8. The front wall 9 of the casing has a plurality of slots 10 through which heated air passes. The casing is mounted on casters 11, and may be moved from place to place by means of handles 12 attached to the end walls thereof.

Mounted in the casing on straps 14 is a boiler 13 having a capacity of about two quarts of water, it being necessary that sufficient water be provided to completely cover the electric heating element 15 positioned in the boiler. Water may be introduced to the boiler through a pipe 17, and a pipe 16 connects the boiler to the header 19 of a fin-type radiator 18, which is arranged so that it is inclined to the horizontal to cause condensed steam to flow back into the boiler.

A blow-off valve 21 is attached to the header 19, the valve 21 being adjusted to enable the escape of steam when the pressure exceeds about 25 pounds. Attached to the header 20 of the radiator is a vacuum air valve 22 of a well known type which allows the escape of air from the radiator, but which closes when in contact with steam.

Also communicating with header 20 is a tube 23 which is attached to a control device 24 of the type described in United States Patent No. 1,734,205. This control device includes a mercury switch in circuit with the heating element, and when the steam pressure exceeds a predetermined amount, for example 10 lbs., the mercury switch is tilted to break the circuit through the heating element, and when the pressure drops to a predetermined amount, for example 3 lbs., the switch closes to reestablish the electrical circuit through the heating element. In series with the control device 24 is an air thermostat 25, also including a mercury switch, the thermostat being also described in the above mentioned patent.

The radiator 18 is tightly enclosed in an air duct 26 which has its mouth in register with the slots 10 in the front wall 9 of the casing 7.

In operation, electric current is supplied to the heating element 15 to produce steam in the boiler and radiator, and the heat of the steam is transmitted by conduction to the fins of the radiator. The air duct 26 creates a chimney effect to cause the cold air below the boiler to be drawn up over the heated fins in the radiator 18, and the air thus warmed, passes through the slots 10 with an appreciable velocity. The air in the room is rapidly heated by convection, the cold air being drawn up through the fins of the radiator 18 and the warm air rising in the room. As is well known, air is a poor conductor of heat; and it is readily seen that the heater herein described does not depend upon the conduction of heat by the air. The heater actually heats the air itself and then throws the heated air to the various parts of the room, at the same time drawing cold air to be heated. As a result, the heating of a room may be rapidly and conveniently accomplished.

The pressure of the steam gradually increases as heat is continually applied to the water by the heating element 15, and when the pressure reaches 10 lbs. the control device 24 opens the electric circuit and the heating element becomes ineffective until the pressure again drops to 3 lbs., at which time the control device 24 causes the electrical circuit to be closed. In the event, that the control device fails and the pressure continues to rise, damage to the apparatus from excessive pressure is prevented by the blow-off valve 21 which opens when the pressure is about 25 lbs.

In the event that the control device 24 and the blow-off valve 21 should both fail to operate, a further safety feature is provided in the nature of a strip 28 of metal which fuses at about 500° F., which is connected to terminals 29 and 30 and mounted on a porcelain block 27, which is attached to the boiler 13 so that the fusible strip 28 will readily receive the heat of the boiler, the strip being insulated from the boiler by a sheet 40 of mica or other insulating material. Should the water leak out of the boiler and the heating element be uncovered with water, the heat produced will cause the metal of the boiler to become dangerously hot. But before the danger point is reached, the strip 28 will melt to break the electrical circuit through the heating element 15 and stop the further production of heat.

Positioned above the air duct 26 and near the top of the casing is a trough 31 holding about two gallons of water. Attached to an end wall of the trough is an element 32 to which is pivotally connected a tube 33 through which passes wires to a small electrical heating element 34 the connection between the heating element and the tube being water tight. A hollow float ball 35 is attached to the heating element, so that the heating element and tube sink to only about one inch below the surface of the water. By means of this arrangement only the surface of the water is heated to cause water vapor which is drawn through slots 36 in the wall 9, above the slots 10. Water vapor passing through slots 36 is drawn into the stream of hot air passing through slot 10 for humidifying purposes. The heating element 34 may be connected in circuit with the control device 24 so that when the circuit is broken through the main heating element 15, it will also be broken through the small heating element 34. If so desired, the heating element 34 and the humidifying apparatus may be removed without affecting the general operation of the radiator.

Women often find it convenient to dry hosiery, lingerie, etc. indoors, and with this purpose in view, a rack may be readily attached to the side walls of the casing 7, adjacent the top, and supported so that a bar lies in front of and parallel with the slots 10, whereby clothing on the rack bar will be readily dried by the rapidly moving hot air passing through the slots 10.

From the above description it will be seen that there has been provided an efficient and effective steam heating device which is entirely automatic in operation. The device is efficient as all of the heat put into the device is used. There is no waste. When once connected to a source of electrical current, it is not necessary to further attend to the heater, for the thermostat 25 may be set to maintain the temperature of the room constant; and there are no ashes to remove, or other attentions necessary.

The foregoing disclosure is to be regarded as descriptive and illustrative only, and not as restrictive or limitative of the invention, of which, obviously an embodiment may be constructed including modifications without departing from the general scope herein indicated and denoted in the appended claims.

Having thus described the invention, what is claimed and desired to be protected by Letters Patent, is:

1. A humidifying device, comprising a trough to hold water, a tube pivotally connected to a wall of the trough, an electrical heating element having a water-tight connection with the tube, wires passing through the tube to the heating element, and means to float the heating element so that it will heat substantially only the surface of water in the trough to create water vapor for humidifying purposes.

2. In an electric-steam heating device, a casing having a plurality of slots in its front wall, a boiler mounted in the casing, an electric heating element positioned in the boiler, a fin-type radiator connected to the boiler, an air duct tightly fitting around the radiator and having its mouth opening into the slots, a trough containing water positioned slightly above the air duct, and means for heating the surface of the water to create a water vapor, said casing having additional slots in its front wall above the first mentioned slots through which the water vapor is drawn into the stream of hot air passing through the first mentioned slots.

3. In a heating device, a casing having a plurality of slots in its front wall, a fin-type radiator mounted in the casing, means to supply steam to the radiator, an air duct fitting around the radiator and having its mouth opening into the slots, a receptacle containing water positioned adjacent the air duct, and means for heating the surface of the water to create a water vapor which is drawn into the stream of hot air passing through the slots.

4. A clothes drying device, comprising a casing having a plurality of slots in its front wall, a fin-type radiator mounted in the casing, means to supply steam to the radiator, an air duct fitting around the radiator and having its mouth opening into the slots, and a clothes supporting rack mounted on the casing, said rack being positioned immediately in front of the slots so that hot air passing through the slots will have a drying effect upon clothing supported by the rack.

5. In an electric-steam heating device, a boiler, an electrical heating element mounted in the boiler, an electric circuit including the heating element, a block of insulating material mounted on the boiler, terminals mounted on the block, a strip of fusible metal supported by the block and connecting the terminals so that the metal will melt when the temperature of the boiler exceeds a predetermined amount, and a sheet of insulating material supported by the block and preventing the fusible metal from directly contacting the boiler, said sheet of insulating material being in direct contact with the boiler and with the strip of fusible metal.

In testimony whereof I affix my signature.

HAROLD C. PENNINGTON.